US006910364B2

(12) United States Patent
Girbig

(10) Patent No.: US 6,910,364 B2
(45) Date of Patent: Jun. 28, 2005

(54) DIAGNOSIS METHOD FOR DETECTING AGEING SYMPTOMS IN A STEAM TURBINE

(75) Inventor: Paul Girbig, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 151 days.

(21) Appl. No.: 10/344,846

(22) PCT Filed: Aug. 6, 2001

(86) PCT No.: PCT/EP01/09069

§ 371 (c)(1),
(2), (4) Date: Feb. 19, 2003

(87) PCT Pub. No.: WO02/15131

PCT Pub. Date: Feb. 21, 2002

(65) Prior Publication Data

US 2004/0010387 A1 Jan. 15, 2004

(30) Foreign Application Priority Data

Aug. 17, 2000 (EP) ........................................... 00117708

(51) Int. Cl.[7] ........................... G01L 3/26; G01M 15/00

(52) U.S. Cl. ........................... 73/1.27; 73/1.28; 73/112; 702/34; 702/50; 702/113; 702/182; 702/183

(58) Field of Search ................................ 73/1.27, 1.28, 73/112; 702/34, 35, 50, 60, 113, 182, 183; 703/2, 7

(56) References Cited

U.S. PATENT DOCUMENTS

| | | | | |
|---|---|---|---|---|
| 4,719,587 A | * | 1/1988 | Berte | 702/34 |
| 4,891,948 A | * | 1/1990 | Kure-Jensen et al. | 60/645 |
| 5,201,180 A | | 4/1993 | Girbig | 60/646 |
| 5,913,184 A | | 6/1999 | Girbig | 702/182 |
| 6,208,953 B1 | * | 3/2001 | Milek et al. | 703/7 |

FOREIGN PATENT DOCUMENTS

| | | | | |
|---|---|---|---|---|
| DE | 44 24 743 A | | 1/1996 | 702/182 |
| EP | 0 895 197 A | | 2/1999 | 703/7 |
| JP | 60-209134 | | 10/1985 | |
| JP | 3-100306 | * | 4/1991 | |
| JP | 5-195720 | * | 8/1993 | |
| JP | 11-229820 | * | 8/1999 | |

* cited by examiner

*Primary Examiner*—Daniel S. Larkin
(74) *Attorney, Agent, or Firm*—Harness, Dickey & Pierce, P.L.C.

(57) ABSTRACT

A diagnosis method is for detecting ageing symptoms in a steam turbine. The efficiency and the steam flow rate of an aged steam turbine is compared to the efficiency and the steam flow rate of a relatively new steam turbine. The efficiency and the steam flow rate are calculated using readings at several operating points on the steam turbine. The time history of the efficiency and steam flow rates applied in contrast to parameters such as the peripheral. Mach number, pressure figure and adjustment of the inlet valve provide information on the extent of ageing of the steam turbine.

8 Claims, 2 Drawing Sheets

DIAGNOSIS METHOD FOR DETECTING AGEING SYMPTOMS IN A STEAM TURBINE

This application is the national phase under 35 U.S.C. § 371 of PCT International Application No. PCT/EP01/09069 which has an International filing date of Aug. 6, 2001, which designated the United States of America and which claims priority on European Patent Application number EP 00117708.8 filed Aug. 17, 2000, the entire contents of which are hereby incorporated herein by reference.

FIELD OF THE INVENTION

The invention generally relates to a diagnostic method for the detection of ageing phenomena in a steam turbine.

BACKGROUND OF THE INVENTION

Steam turbines in current generation, in combined-cycle operation and in the chemical industry are expected to have a high degree of availability. If changes to a steam turbine occur which reduce efficiency and, if appropriate, cause a shutdown, this leads to high outage and consequential costs. An early diagnosis of imminent changes to the machine parts of a steam turbine allows conditioned-oriented maintenance planning and thus reduces the operating costs.

An essential information source for assessing the availability and viability of a steam turbine is the knowledge of the condition of those components of the steam turbine around which or through which steam flows during operation. Thus, operators fear, for example, deposits in steam turbines, since these, in addition to reducing the power output and efficiency, may entail an overloading of individual components which is harmful to the plant.

Depending on the type of construction and the field of use, every steam turbine, as a system, exhibits a typical thermodynamic behavior. If the thermodynamic behavior of a steam turbine changes due to faults occurring on components around which steam flows, it is appropriate to detect these changes in relation to normal behavior, so that damage avoidance or at least damage limitation can be put into effect at an early stage. The thermodynamic behavior of a steam turbine is influenced in use, for example, by erosion and corrosion, contamination (for example, by salt deposits), seal wear for example, on sealing strips), thermal deformation (for example, due to the maximum temperature limit being exceeded) and foreign body damage (for example, by impacts of welding beads on the blading).

It must be assumed that the aging phenomena listed above are always accompanied by an impairment in turbine efficiency and steam throughput during the operation of a steam turbine. Impairments in efficiency therefore not only equate to a lower utilization of the energy supplied to the steam turbine, but are also often an early indication of possible damage to steam turbine components around which steam flows. The same also applies to the steam throughput through a steam turbine. A deteriorating steam throughput under identical operating conditions, that is to say with an identical fresh steam pressure, identical inlet valve position and identical turbine rotational speed, likewise points to aging phenomena in the steam turbines.

The customary way of monitoring a steam turbine is to observe the operational indicators for conspicuous readings. This monitoring system has been refined by means of additional measurements of state variables, such as, for example, pressure and temperature at various points in the steam turbine. A further method for the early detection of aging phenomena on a steam turbine is to compare the current operating behavior with the theoretical operating behavior derived from the design of the steam turbine. The basis for this is mathematical models which are adopted from the design of the steam turbine plant and reproduce the thermodynamic behavior of the steam turbine.

Urban, L.A.: "*Gas Path Analysis applied turbine engine condition monitoring*", AIAA Paper 72-1082, New Orleans, 1972, Fiedler, K., Lunderstädt, R.: "*Diagnoseverfahren für RUSTON Gasturbine*" ["*Diagnostic Method for RUSTON Gas Turbines*"], first part report, Gesellschaft für Forschung und Entwicklung mbH, Hamburg, 1985, and Lunderstäidt, R., Fiedler, K.: "*Thernodynamische Zustandsdiagnose an Strömungsmaschinen*" ["*Thermodynamic Condition Diagnosis on Turbomachines*"], *yearbook* 1992 of VDI Gesellschaft Energietechnik, VDI-Verlag, p. 160–178, Düsseldorf 1992, disclose a diagnostic method for aircraft turbine engines, in which state variables, such has the pressure and temperature of the gas turbine, are measured and diagnostic functions are calculated from these, it being possible to draw conclusions as to the aging of the gas turbine from the development in time of these diagnostic functions. The fluidic monitoring principle used there, which is known as gas path analysis, is based on a mathematical modeling of the flow processes in a gas turbine. The modeling principle forms the flowpath theory known in fluid mechanics.

This method has not been used for steam turbines, however, since the method was developed especially for gas turbines and gas turbines differ fundamentally in their form of construction from steam turbines.

SUMMARY OF THE INVENTION

An object of an embodiment of the present invention is, therefore, to specify a diagnostic method, improved in relation to the prior art, for the detection of aging phenomena on a steam turbine.

An object may be achieved by a diagnostic method for the detection of aging phenomena in a steam turbine, in which method, according to an embodiment of the invention, the efficiency and/or the steam throughput coefficient of the steam turbine are/is calculated from measurements of state variables of the steam turbine at a first and a later second time point at a plurality of operating points of the steam turbine. Further, an operating point is determined in each case by a value of the parameters circumferential Mach number, pressure number and inlet valve position. Finally, the extent of the aging of the steam turbine is concluded from the change in efficiency and/or in steam throughput coefficient from the first to the second time point as a function of the operating point.

In the first place, the steam pressures, steam temperatures and steam quantity flows are available from the monitoring of a steam turbine by measurement which, being numerical values, do not make it possible to have direct information on the condition of a turbine. However, the efficiency of the steam turbine and the steam throughflow through the steam turbine (referred to hereafter as the steam throughput coefficient) can be calculated from these directly measurable state variables. Since aging phenomena change the thermodynamic behavior of a turbine, the efficiency and the steam throughput coefficient are also impaired by aging phenomena, since they are in direct relation to the thermodynamic behavior of the steam turbine. An embodiment of the invention, then, is based on the notion that conclusions can be drawn from the efficiency and the steam throughput coefficient of a steam turbine as to the aging condition of the latter, and consequently as to deposits, erosion and corrosion, foreign body damage and wear.

Measurement technology on steam turbines makes available thermodynamic state variables, such as pressures, temperatures and quantity measurements. A knowledge of the wet fraction when wet steam occurs may also be obtained. If the steam turbine drives a generator, the active generator power output of the turbo set is also available as a further measurement value. The efficiency of the steam turbine and the steam throughput coefficient can be calculated from these and from the mechanical data of the steam turbine and, if appropriate, of the turbo set which are known from design.

It became clear, then, that the illustration of the efficiency and of the steam throughput coefficient of the steam turbine as a function of the three parameters circumferential Mach number, pressure number and position of the inlet valves is particularly beneficial for the diagnostic method. The circumferential Mach number, as a measure of the rotational speed of the rotor blades, the pressure number, as a measure of the pressure of the fresh steam supplied to the turbine, and the position of the inlet valves, which regulate the inflow of fresh steam into the steam turbine, thus form a three-dimensional parameter space, in which the efficiency and also the steam throughput coefficient of the steam turbine in each case represent a scalar field. Each point of the three-dimensional parameter space is therefore assigned, for example, an efficiency value.

In this case, the circumferential Mach number $M_u$ may be described by $$M_u = \frac{u}{\sqrt{kp_1 v_1}}$$

and the pressure number F by $$F = \frac{2k}{u^2 k - 1} p_1 v_1 \left[1 - \left(\frac{p_2}{p_1}\right)^{\frac{k-1}{k}}\right]$$

In this case, u is the circumferential speed, k(p,T) the isotropic exponent, $p_1$ the pressure and $v_1$ (p,T) the specific volume at the inlet and $p_2$ the pressure at the outlet of the steam turbine considered or of the turbine subregion considered. The circumferential speed u is given in steam turbines by $$u = 2\pi r_m n,$$

with $r_m$ as the mean radius of the annular area through which steam flows and with n as the rotational speed of the turbine rotor.

A change in the position of the inlet valves for the fresh steam upstream of a regulating stage on a steam turbine causes a geometric change in the steam flow at components through which steam flows. A change in the inlet valve position thus behaves in a similar way to a fault on components around which steam flows. It is therefore indispensable to include the inlet valve position in the illustration of the efficiency of a steam turbine.

For example, the change in the inlet valve position of a steam turbine may lead to a throttling of the steam flow. If, for example, salt deposits occur on the inlet valves in a steam turbine due to insufficient steam quality, this leads to increased flow resistance and therefore likewise to throttling. Without a knowledge of the changed inlet valve position, of the size of the geometric change in the steam inlet and of its effect on the thermodynamic behavior of the steam flow around the inlet valves, the cause of the thermodynamic change cannot be fully comprehended. Cause and effect cannot be associated unequivocally. With the measurement of the inlet valve position, however, a criterion is available for determining the geometric change in the steam flows and its effects on the thermodynamic behavior of the steam turbine. This may be used to determine the cause of the throttling.

A steam inlet valve usually includes a plurality of individual valves. The individual valves often open sequentially with overlap. The position of the inlet valve combination is often indicated in mm of stroke, taking into account the actuating travel for the travelling hydraulics. In order to be independent of the mechanical designs of the actuating hydraulics, it is advantageous to indicate the position of the inlet valves as a percentage.

The efficiency of a steam turbine can be calculated from the measured state variables. The same applies to the steam throughput coefficient. Both variables can, in turn, be illustrated as a function of an operating point which is derived from the value of the circumferential Mach number, of the pressure number and of the inlet valve position at the time point of measurement of the state variables. To diagnose aging phenomena on the steam turbine, at a first time point at which the steam turbine advantageously still has no aging phenomena, for example at the first commissioning of the steam turbine, the state variables are measured at a plurality of operating points of the steam turbine and the efficiency of the steam turbine is calculated from these.

The efficiency values are assigned the respective operating point. After a particular time, for example one year, the measurements are repeated. It is advantageous to select the operating points for the measurements at the second time point in such a way that they are approximately identical to the operating points of the measurements of the first time point. The more exactly the first and second operating points are in congruence, the more accurate the evidence can be as to the aging condition of the steam turbine.

One operating point (or two approximately identical operating points), then, can be assigned two efficiency values: one from the measurement of the first time point and one from the measurement of the second point. If the efficiency has deteriorated at an operating point in the time between the first time point and the second time point, this is attributable to thermodynamic changes within the steam turbine. Since there is a plurality of efficiency changes at various operating points, detailed evidence on the thermodynamic changes of the steam turbine can be obtained from these. The extent and nature of aging phenomena, for example erosions or deposits within the steam turbine, can be concluded from this detailed evidence. The same applies to the steam throughput coefficient, from the change in time of which conclusions as to aging can likewise be drawn.

The calculations are expediently based on the behavior of ideal steam. Although a steam turbine is operated with real steam, the thermodynamic behavior of the latter differs from that of ideal steam. However, basing the behavior on ideal steam considerably simplifies the calculations. Since steam turbines are operated with superheated steam, this approximation is permissible. For more accurate calculations which must be based on the thermodynamic behavior of real steam, the calculations on which the ideal steam laws are based can be refined by means of numerical methods.

In an advantageous embodiment of the invention, the efficiency and/or the steam throughput coefficient of the steam turbine are calculated at a plurality of first operating points of the steam turbine at a first time point and a first scalar field is calculated from these first measurement values by interpolation. Then, the efficiency and/or the steam throughput coefficient are/is calculated at a plurality of second operating points of the steam turbine at a second time point and a second scalar field is calculated from these measurement values by interpolation. The extent of aging of the steam turbine is concluded from the change in time of the first scalar field in relation to the second scalar field.

If measurements of the state variables are carried out at a first time point at a plurality of first operating points and the calculation of the efficiency and/or of the steam throughput coefficient is carried out from these, it is no longer necessary, in this embodiment of the invention, to place the operating points for the measurements at a second and later time point into the vicinity of the first operating points. The operating points at which the measurements and calculations are carried out at a second time point can thus be selected completely independently of the operating points of the first time point. This makes it possible that the steam turbine can be operated at the second time point in an operating mode which is completely independent of the operating mode at the time point of the first measurement. This is because, now, no longer are two values of, for example, the steam throughput coefficient at mutually corresponding first and second operating points compared, but, instead, two continuous scalar fields are compared.

The interpolation details may be gathered per se from the values of efficiency or steam throughput coefficient at the various operating points. If there are sufficient values at various operating points, the profile of the scalar field can be estimated and the intermediate regions between various operating points can be filled with further values by appropriate interpolation. If the characteristic of the scalar field for a type of steam turbine is known, measurements and subsequent calculations are necessary at only a few operating points, so that the highly accurate profile of the scalar field can be estimated. There are thus fixed values for the steam throughput coefficient and/or the efficiency of the steam turbine at every point of the three-dimensional parameter space. The values of efficiency or steam throughput coefficient from a first time point at any desired operating point can therefore be compared with the values of efficiency or steam throughput coefficient from a second time point. The extent of aging of the steam turbine can be concluded from these direct comparisons. It is likewise possible to consider the two scalar fields as continuums and to conclude the extent of the aging of the steam turbine from their change as a whole.

Advantageously, the efficiency and/or the steam throughput coefficient is calculated for a subregion of the steam turbine and the extent of aging of the subregion is concluded from this. The measurements of the state variables, such as the pressure, temperature and steam quantities of the steam turbine, can be measured at spatially different points of the steam turbine. It is thus possible to calculate the efficiency and/or the steam throughput coefficient for only a subregion, for example the turbine inflow region or the drum part.

The advantage of this method is that the spatial location of aging phenomena within the steam turbine is possible. So that changes in the steam turbine can be easily located within the framework of the thermodynamic diagnosis, it is advantageous as far as possible to subdivide the turbine into individual turbine sections through which steam flows. However, the assessment of the thermodynamic behavior of a turbine section is tied up with the knowledge of the boundary conditions, such as, for example, the steam pressure and steam temperature at the inlet and outlet of the turbine section. If appropriate, the drum part may be broken down into a plurality of drum subparts for measurement purposes.

In counterpressure turbines which are operated solely in the superheated steam state, the outflow region is assigned to the drum part. As regards the outflow region of condensation turbines, the difficulty arises that, by the measurement of pressure and temperature alone, the energy content of the wet steam is not described. It can be calculated, however, by an evaluation of the discharged heat quantity in the following condenser. If unregulated steam quantities are extracted from a steam turbine in the drum part at tapping points, these drum parts must be considered as drum parts connected in series. The outlet values for steam, temperature and steam pressure of the preceding drum part are the inlet values for the following drum part, taking into account the reduced steam quantity. The precondition is that the final steam quantity and its state values are detected by measurement. The turbine inflow region contains, as a rule, a fresh steam connection piece, steam sieve, quick-action shut-off valve, inflow box, inlet valve combination and regulating stage.

BRIEF DESCRIPTION OF THE DRAWINGS

An exemplary embodiment of the invention is explained with reference to four figures of which.

DETAILED DESCRIPTION OF THE PREFERRED EMBODIMENTS

Figure 1:
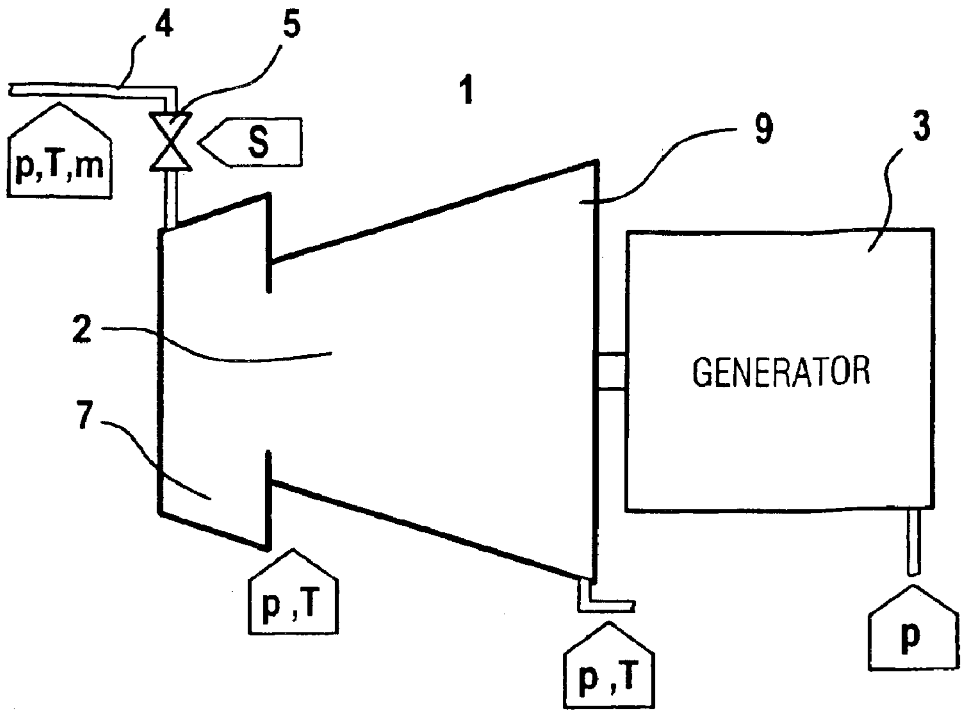
FIG. 1 shows a diagrammatic illustration of a steam turbine plant.

FIG. 1 shows a diagrammatic illustration of a steam turbo set 1 which includes a steam turbine 2 and a following generator 3. The steam turbo set 1 considered is installed in a heating power station which, for example, supplies a town with heating heat. In the heating power station, a plurality of boiler plants, not illustrated in FIG. 1, feed a plurality of steam turbo sets via a busbar system, not illustrated in any more detail. The steam turbine 2 is designed as an axial counterpressure turbine. The fresh steam is led via pipelines 4 through quick-action shut-off valves, not illustrated in any more detail, to the steam turbine 2. The turbine inflow region of the steam turbine 2 includes the inlet valves, referred to hereafter as the regulating valve combination 5, and the following regulating stage 7.

The regulating valve combination 5 includes four regulating valves. In the regulating stage 7, the steam is expanded from 110 bar to about 60 bar (wheel space pressure). In the further run through the steam turbine 2, the steam is further expanded in the drum part 9 and is fed on the exhaust-steam side into a steam system, not illustrated in any more detail, with an operating pressure of, for example, 13 bar.

The blading of the steam turbine 2 includes a single-stage blading in the regulating stage 7 of the constant-pressure form of construction and of four successive drum parts with different stage radii of the reaction form of construction in the drum part 9. For the thermodynamic diagnosis, the steam turbine 2 is subdivided into the turbine inflow region with regulating valve combination 5 and regulating stage 7 and the drum part 9.

The steam turbine 2 is operated with superheated steam, so that no wet-steam states occur. This is afforded by the abovementioned steam parameters. The design data of the turbine inflow region and the throughflow characteristics of the regulating valve combination 5 are available as backup from the design of the steam turbo set 1. The steam throughput coefficient and the circumferential Mach number relate in each case to the inlet side of the two subregions, namely the turbine inflow region and the drum part of the steam turbine 2.

State variables of the steam turbine 2 were measured at one hundred different time points within two years. The term "time point" is not interpreted hereafter as a discrete time value, but as a time interval, within which the state variables have been measured in a measurement period. What have been me the pressure p and the temperature T and also the quantity m of the fresh steam flowing through the pipelines 4, the position S of the regulating valve combination 5, the pressure p and the temperature T of the steam leaving the regulating stage 7 and the pressure p and temperature T of the steam emerging from the drum part 9. Moreover, the power output P of the generator has been measured. The state variables of the steam turbine have been measured in each case at a plurality of operating points of the steam turbine within a measurement period. The efficiency W and the steam throughput coefficient F for each operating point of a measurement period have been calculated from the measurements. The calculation has been based on the following formulae:

$$\Delta F = \Delta F_A - \frac{D}{f(D, M_u, S)}\frac{\partial f(D, M_u, S)}{\partial D}\Delta D - \frac{M_u}{f(D, M_u, S)}\frac{\partial f(D, M_u, S)}{\partial M_u}\Delta M_u - \frac{S}{f(D, M_u, S)}\frac{\partial f(D, M_u, S)}{\partial S}\Delta S$$

$$\Delta W = \Delta W_A - \frac{D}{g(D, M_u, S)}\frac{\partial g(D, M_u, S)}{\partial D}\Delta D - \frac{M_u}{g(D, M_u, S)}\frac{\partial g(D, M_u, S)}{\partial M_u}\Delta M_u - \frac{S}{g(D, M_u, S)}\frac{\partial g(D, M_u, S)}{\partial S}\Delta S$$

with
F: steam throughput coefficient
$F_A$:
W: efficiency
$W_A$:
D: pressure number
$M_u$: circumferential Mach number
S: inlet valve position In each case a scalar field for the efficiency and the steam throughput coefficient of a measurement period have been determined by interpolation from a plurality of values for the efficiency and the steam throughput coefficient. Thus, after the conclusion of the one hundred measurement periods, in each case one hundred scalar fields for the efficiency and the steam throughput coefficient have been obtained.

Figure 2:
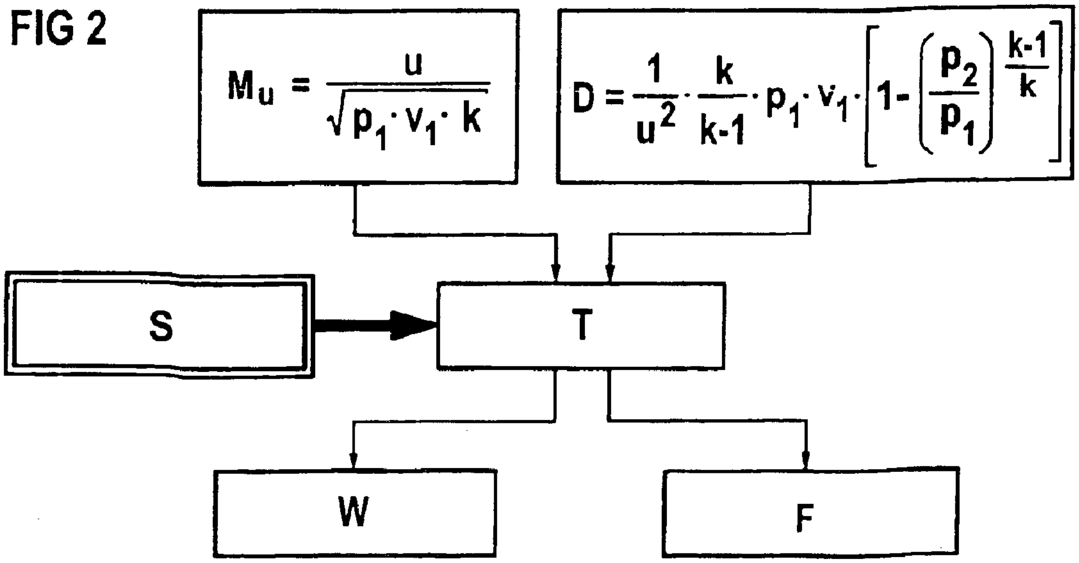
FIG. 2 shows a diagrammatic illustration of the operation of calculating the efficiency and steam throughput coefficient.

FIG. 2 illustrates diagrammatically the calculation of the efficiency W and of the steam throughput coefficient F. The two parameters circumferential Mach number $M_u$ and pressure number D are calculated from the state variables pressure, temperature and steam quantity, which are measured on the steam turbine at the points shown in FIG. 1. In this case, over the turbine section considered, in this case the turbine inflow region, u is the circumferential velocity, k the isentropic exponent calculable from the pressure and temperature, $p_1$ the pressure, $v_1$ the specific volume, calculable from the temperature and pressure, at the inlet of the turbine section, and $p_2$ of the pressure at the outlet of the turbine section. The circumferential velocity u is calculated by use of $u=2\pi r_m n$, $r_m$ being the mean radius of the annular area through which steam flows and n being the rotational speed of the turbine rotor. The position S of the inlet valves (indicated as a percentage) is introduced as the third parameter. From the state variables and the parameter position S, circumferential Mach number $M_u$ and pressure number D, the efficiency W and the steam throughput coefficient F of the steam turbine T can be calculated when design-related data of the steam turbine T are additionally available.

Figure 3:
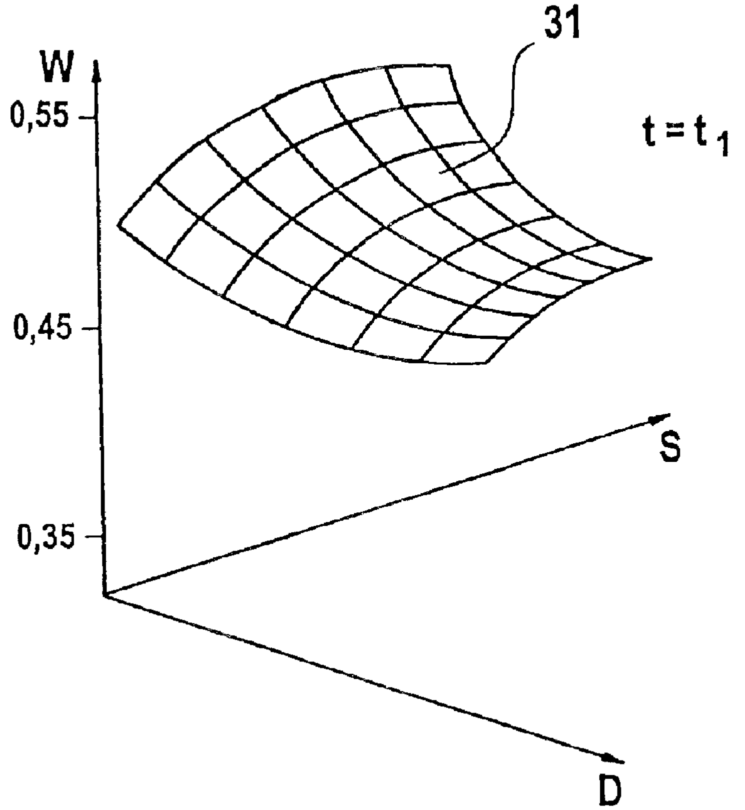
FIG. 3 shows a scalar field assigned to a first time point.
Figure 4:
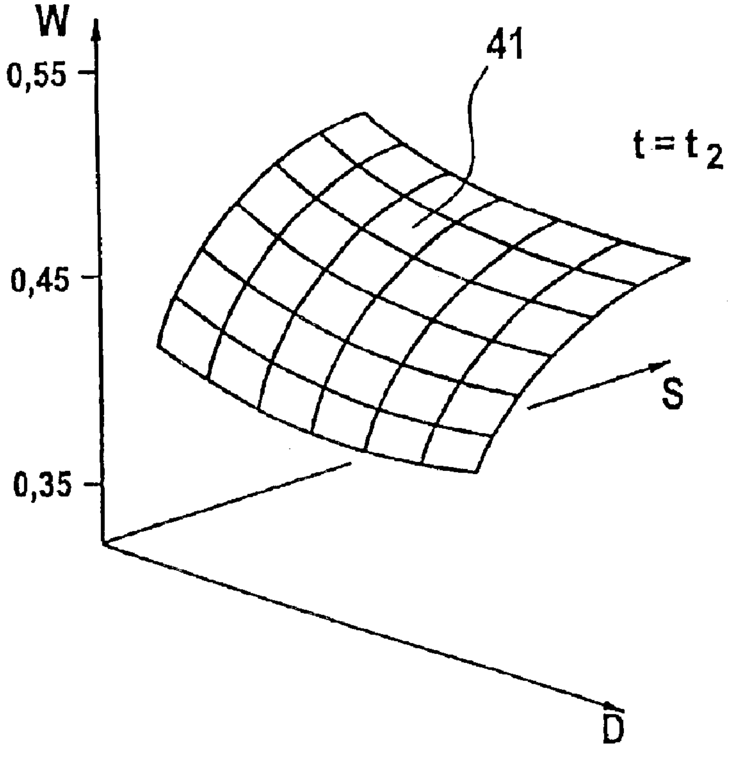
FIG. 4 shows a scalar field assigned to a second time point.

FIG. 3 and FIG. 4 illustrate diagrammatically two scalar fields 31, 41 for the efficiency W at two different time points $t_1$ and $t_2$. $T_1$ is a time point at which the steam turbine was without aging phenomena and $t_2$ is about one year later. FIG. 3 shows a scalar field 31 in the form of a curved surface which is plotted against the parameters pressure number D and inlet valve position S. The parameter circumferential Mach number is left constant in this illustration and is not plotted as a parameter, so that the scalar field 31 can be illustrated in the form of a two-dimensional curved surface. It is, of course, also possible to illustrate the scalar field 31 against two other parameters of the three parameters circumferential Mach number $M_u$, pressure number D and inlet valve position S, or against all three parameters.

In FIG. 4, the efficiency W of the turbo inflow region is plotted in a similar way to FIG. 3 against the parameters inlet valve position S and pressure number D, as a scalar field 41. The scalar field 41 from FIG. 4 is changed in form in relation to the scalar field 31 from FIG. 3. Moreover, it is lower than the scalar field 31: the efficiency W of the turbine inflow region is therefore lower at the second later time point $t_2$ than at the first time point $t_1$. From the change in form of the scalar field 41, as compared with the scalar field 31, and from the reduction in efficiency W at various operating points, conclusions can be drawn as to the extent of aging of the turbine inflow region.

Measurements were carried out, as described with regard to FIG. 1, at one hundred time points, that is to say within one hundred measurement periods, and were plotted, as in FIGS. 3 and 4. By use of the multiplicity of measurements in one hundred different measurement periods, the time profile of the impairment in the efficiency W could be determined with high accuracy. Since similar measurements to those for the turbine inflow region were also carried out for the drum part 9 of the steam turbine 2, the aging phenomena within the steam turbine 2 could also be locally delimited it was found that aging had occurred preeminently in the turbine inflow region, since the efficiency had fallen to the greatest extent there. Moreover, by virtue of the multiplicity of measurement periods, the timespan in which the greatest change in the efficiency W took place could be located with very high accuracy.

On enquiries made to the operator of the steam turbine 2, it was found that, at that time point when the rapid impairment in the efficiency W was found afterwards, the heating power station had, to satisfy a high demand for heat. According to the operator's evidence, therefore, at that time point steam boilers were put into operation which had previously been shut down for a while.

Within the one hundred measurement periods, not only the efficiency W of the turbo inflow region and of the drum was, calculated, but also the steam throughput coefficient F. In the same way as the efficiency W, the steam throughput coefficient F was also calculated and plotted as a scalar field against the parameters circumferential Mach number $M_u$, pressure number D and inlet valve position S. From the interaction between the changed efficiency W and the changed steam throughput coefficient F in the turbine inflow region, it could be diagnosed that, at the time point of the greatest changes, contamination was deposited to an increased extent on parts of the turbine inflow region around which steam flows. The operator could therefore be advised that, by new boilers being commissioned, contaminated steam had entered the steam turbine, with the result that contaminations had been deposited within the steam turbine 2 to an increased extent. From the extent of the reduction in the efficiency W and in the steam throughput coefficient F, the extent of the dirt deposits could be concluded and a deadline for the next inspection of the steam turbine 2 could be designated to the operator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A diagnostic method for the detection of aging phenomena in a steam turbine, comprising:

calculating efficiency of the steam turbine from measurements of state variables of the steam turbine at a first time point and at a relatively later second time point at a plurality of operating points of the steam turbine, wherein an operating point is determined by a value of parameters including at least one of circumferential Mach number, pressure number and inlet valve position; and determining an extent of the aging of the steam turbine from a change in the efficiency calculated at the first time point to the efficiency calculated at the second time point as a function of the operating point.

2. The diagnostic method as claimed in claim 1, wherein, a) the efficiency of the steam turbine is calculated at a plurality of first operating points of the steam turbine at a first time point, b) a first scalar field is calculated from these first measurement values by interpolation, c) the efficiency is calculated at a plurality of second operating points of the steam turbine at a second time point, d) a second scalar field is calculated from these second measurement values by interpolation, and e) the extent of the aging of the steam turbine is determined from the change in time from the first scalar field to the second scalar field.

3. The diagnostic method as claimed in claim 1, wherein the efficiency is calculated for a subregion of the steam turbine and the extent of the aging of the subregion is determined.

4. The diagnostic method as claimed in claim 2, wherein the efficiency is calculated for a subregion of the steam turbine and the extent of the aging of the subregion is determined.

5. A diagnostic method for the detection of aging phenomena in a steam turbine, comprising:

calculating a steam throughput coefficient of the steam turbine from measurements of state variables of the steam turbine at a first time point and at a relatively later second time point at a plurality of operating points of the steam turbine, wherein an operating point is determined by a value of parameters at least one of circumferential Mach number, pressure number and inlet valve position; and determining an extent of the aging of the steam turbine from a change in the steam throughput coefficient calculated at the first time point to the steam throughput coefficient calculated at the second time point as a function of the operating point.

6. The diagnostic method as claimed in claim 5, wherein, a) the steam throughput coefficient of the steam turbine is calculated at a plurality of first operating points of the steam turbine at a first time point, b) a first scalar field is calculated from these first measurement values by interpolation, c) the steam throughput coefficient is calculated at a plurality of second operating points of the steam turbine at a second time point, d) a second scalar field is calculated from these second measurement values by interpolation, and e) the extent of the aging of the steam turbine is determined from the change in time from the first scalar field to the second scalar field.

7. The diagnostic method as claimed in claim 5, wherein the steam throughput coefficient is calculated for a subregion of the steam turbine and the extent of the aging of the subregion is determined.

8. The diagnostic method as claimed in claim 6, wherein in steam throughput coefficient is calculated for a subregion of the steam turbine and the extent of the aging of the subregion is determined.

* * * * *